United States Patent [19]
Ohkawa et al.

[11] 3,947,388
[45] Mar. 30, 1976

[54] FOAMED PLASTICS AND PROCESS FOR PREPARING THE SAME

[75] Inventors: Hideo Ohkawa; Masami Tomikawa, both of Chiba, Japan

[73] Assignee: Idemitsu Kosan Company Limited, Tokyo, Japan

[22] Filed: May 23, 1974

[21] Appl. No.: 472,797

[30] Foreign Application Priority Data
May 30, 1973  Japan.............................. 48-60453

[52] U.S. Cl.......... 260/2.5 R; 260/2.5 P; 260/2.5 H; 260/2.5 HA; 260/2.5 HB; 260/42.18; 428/426
[51] Int. Cl.²....................... C08J 9/18; C08K 7/20
[58] Field of Search ........ 260/2.5 P, 2.5 H, 2.5 HA, 260/2.5 HB, 2.5 R, 42.18, 42.33, 42.39, 42.41, 42.37, 42.46, 42.49, 42.53; 428/406

[56] References Cited
UNITED STATES PATENTS

| | | | |
|---|---|---|---|
| 3,235,519 | 2/1966 | Hunter................................ | 260/2.5 |
| 3,306,862 | 2/1967 | Mageli et al......................... | 260/2.5 |
| 3,661,839 | 5/1972 | Klopfer........................... | 260/41 AG |
| 3,725,119 | 4/1973 | Coffey et al. .................. | 117/104 R |

OTHER PUBLICATIONS

R. E. Lavengood et al. (Monsanto Co.) J. Appl. Polym. Sci., Vol. 17, No. 4, pp. 1173–1185, (1973).
D. W. Sundstorm, et al., (Univ. of Conn.) J. Appl. Polym. Sci., Vol. 16, No. 12, pp. 3159–3167, (1972).
L. E. Nielsen (Monsanto Co.) J. Appl. Poly. Sci., Vol. 17, No. 12, pp. 3819–3820 (1973).
Fillers for Molding Compounds, R. Seymour; Modern Plastics Encyclopedia pp. 578, 582, Vol. 45, No. 1A, 9/67.
Fillers for Plastics, R. Seymour; Modern Plastics Encyclopedia pp. 217, 218, 220, 222, Vol. 51, No. 10A, 10/74.

*Primary Examiner*—John Kight, III
*Attorney, Agent, or Firm*—Flynn & Frishauf

[57] ABSTRACT

Foamed thermoplastic resin which contains glass beads of from 1 to 2 mm in diameter has an improved mechanical strength and enhanced light reflection ability.

6 Claims, 2 Drawing Figures

FOAMED PLASTICS AND PROCESS FOR PREPARING THE SAME

BACKGROUND OF THE INVENTION a. Field of the Invention

The present invention relates to novel foamed plastics for light weight structural materials, in which glass beads have been mixed and distributed evenly. Further, the present invention relates to a process for preparing the same.

b. Description of the Prior Art

Heretofore, it has been known to produce foamed plastics with increased mechanical strength by blending small amounts of an inorganic filler such as talc, calcium silicate and so on to a thermoplastic resin such as polyvinyl chloride resin, polyethylene resin, polypropylene resin, polystyrene resin and so on.

However, glass beads have not been employed as a filler for foamed plastics.

SUMMARY OF THE INVENTION

A novel foamed plastics containing glass beads of from 1 to 2 mm in diameter has an improved mechanical strength and enhanced light reflection ability. This foamed plastics can be obtained by mixing a thermoplastic resin, glass beads of from 1 to 2 mm in diameter, a blowing agent and a crosslinking agent and applying the thus mixed composition to a conventional foam molding process.

An object of the present invention is to provide a foamed plastics useful for light weight structural material which has an improved mechanical strength and enhanced light reflection ability.

Another object of the present invention is to provide a process for preparing the same.

DESCRIPTION OF THE PREFERRED EMBODIMENTS

We have studied the relationships between kinds of fillers and physical properties of foamed plastics obtained by blending with a filler, and have found that by mixing and dispersing glass beads of 1 to 2 mm in diameter in foamed plastics, useful foamed plastics having improved mechanical strength and enhanced light reflection ability are obtained. On the basis of this finding, the present invention was achieved.

Glass beads which can be used in the present invention are those of 1 to 2mm in diameter. When the diameter is smaller than 1 mm, for example 0.3 to 0.5 mm, glass beads tended to break away from the surface of foamed plastics. While, larger than 2 mm, glass beads tended to be detached because of poor adhesion between glass beads and resin.

Generally, the amount of glass beads used in the present invention may be in the range of from 10 to 70 parts by weight per 90 to 30 parts by weight of thermoplastic resin.

As a thermoplastic resin, various resins of common use, for example vinyl resins such as polyvinyl chloride, polystyrene and so on; polyolefin resins such as polyethylene, polypropylene, polybutadiene, polyisoprene, co-polymer of ethylene and vinylacetate, co-polymer of ethylene and propylene, co-polymer of styrene and butadiene, the mixture of polyethylene and polybutadiene and so on, can be used in this invention.

Foamed plastics indicated in the present invention have a structure comprising dispersed glass beads in the above mentioned foamed thermoplastic resin and such foamed plastics can be made by the conventional foam-molding process.

Figure 1:
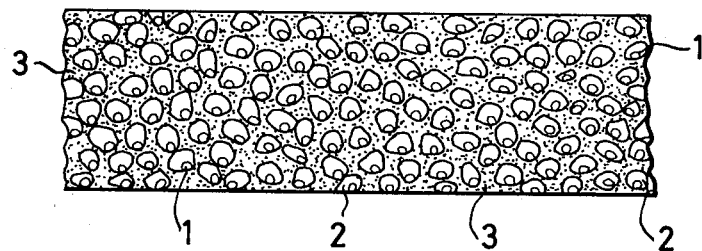
FIGS. 1 and 2 are sectional views of the structure of foamed plastics of the process of the invention.

For instance, mixing a thermoplastic resin, glass beads, a blowing agent and a cross-linking agent at a temperature of from 90° to 180°C, preferably from 90° to 150°C, by an appropriate means of mixing such as an Intermixer is suitable. The resulting mixed composition was placed in an air-tight mold of a compression molding machine and was heated to 180° to 200°C under pressure ($\geq 30$ kg/cm$^2$). Subsequently, by opening the mold instantaneously, foamed plastics having a structure as shown in FIG. 1 was obtained. In the resulting foamed plastics, (1) is glass bead, (2) is a bubble of larger size formed from glass bead as a core, and (3) is foamed resin containing tiny bubbles which were formed through connecting bubbles (2) serially, and using a blowing agent as a core.

As a blowing agent for preparing aforementioned foamed plastics, such commonly used blowing agents as azodicarbonamide, diphenylsulfone-3,3'-disulfohydrazide, benzene sulfone acid diphenylhydrazide and the like can be used. The blowing agent can be added in the amount of from 7 to 2.5 parts by weight per 100 parts by weight of total amount of thermoplastic resin and glass beads. As a cross linking agent, organic peroxides such as di-tertiary butyl peroxide, 1,3-bis(t-butyl peroxyisopropyl)benzene, dicumyl peroxide and so on can be employed. The cross linking agent can be added in the amount of from 0.4 to 0.15 parts by weight per 100 parts by weight of total amount of thermoplastic resin and glass beads.

Figure 2:
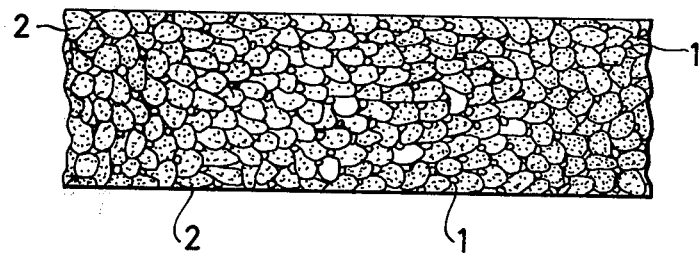

Furthermore, according to another embodiment of the present invention, foamed plastics having a structure comprising dispersed glass beads in a foamed plastics of plastic beads can be provided, as shown in FIG. 2. In FIG. 2, (1) is glass bead, (2) is foamed bead formed through foaming of plastic beads and these foamed beads connect with each other through glass bead (1). This type of foamed plastics can be prepared as follows; after dry-blending plastic beads (containing blowing agents such as pentane, butane and so on) and glass beads, the resulting mixture was placed in a predetermined mold with a steam injector for heating and then heated steam (about 90° to 110°C) was introduced through a steam injector in order to foam plastic beads and to fuse plastic beads through glass beads.

Foamed plastics of the present invention contain a large amount of glass beads in a state of dispersion, and thus they show considerably improved mechanical strength such as hardness, compressive yield strength, bending strength, tensile strength and so on. Furthermore they show improved properties in steadiness of dimension weatherproof, resistance to chemicals and so on. A further advantageous feature of the foamed plastics of the present invention is their enhanced light reflection rate due to good light reflection ability of glass beads.

Taking advantage of excellent properties of foamed plastics of the present invention, they can be used advantageously as various structural materials of light weight, especially for traffic signs at night, indicators, because of their favourable light reflection ability, and also they can be used as interior materials and so on.

The invention is described in detail by means of the following specific examples.

The detailed conditions of the experiments and characters of resulted foamed plastics are shown in Table 2.

Table 2

| poly-ethylene | Mixture of materials (part by weight) | | | cross linking agent | Blowing time (min.) | Properties of foamed plastics | | |
|---|---|---|---|---|---|---|---|---|
| | *glass beads | blowing agent | | | | density (g/cm³) | compressive yield strength (kg/cm²) | bending strength (kg/cm²) |
| 50 | ⁽ᴬ⁾50 | 3.5 | | 0.20 | 14 | 0.120 | 1.9 | 4.9 |
| 40 | ⁽ᴬ⁾60 | 3.0 | | 0.20 | 12 | 0.134 | 2.3 | 5.6 |
| 60 | ⁽ᴮ⁾40 | 4.5 | | 0.25 | 16 | 0.135 | 1.4 | 1.9 |

*glass beads
⁽ᴬ⁾0.05 to 0.4 mm in diameter
⁽ᴮ⁾3 to 5 mm in diameter

EXAMPLE 1

Low density polyethylene resin (density 0.923 g/cm³, melt index 5.0) and glass beads (1 to 2 mm in diameter, Tsuchiya Kaoline, Co. Ltd.) were mixed and to the mixture a blowing agent (azodicarbonamide) and a cross linking agent (1,3-bis(t-butyl peroxyisopropyl)-benzene) were added and then the whole mixture was mixed thoroughly at 90° to 100°C by Intermixer.

Then the resulting compound was placed in a airtight mold of a compression molding machine and was heated for a prescribed time at 180° to 200°C under a pressure of 30 kg/cm², and then by opening the mold instantaneously, foamed plastics having excellent light reflection ability was obtained.

The detailed conditions of the experiments and properties of resulted foamed plastics are shown in Table 1.

Compressive yield strength was measured by ASTM Z0234 under the condition of rate, 5 mm/min, and bending strength was measured by ASTM D790 under the condition of rate, 5 mm/min.

EXAMPLE 2

Seventy parts by weight of commercial polystyrene beads (0.8 to 1 mm in diameter) and 30 parts by weight of glass beads (1 to 2 mm in diameter) were mixed well and then the mixture was packed in a mold (200 × 200 × 50 mm). Foaming process was conducted by introducing hot air of 90° to 105°C through a steam injector of the mold under 10 kg/cm² by gauge pressure. After cooling them foamed plastics having foaming magnification of about 20 and excellent light reflection ability was obtained.

The resulted foamed plastics has a density of 0.045 g/cm³, compressive yield strength of 2.5 kg/cm² and bending strength of 5.4 kg/cm². In contrast, foamed plastics without glass beads has a compressive yield strength of 1.6 kg/cm² and bending strength of 4.3 kg/cm².

EXAMPLE 3

Table 1

| poly-ethylene | Mixture of materials (part by weight) | | cross linking agent | Blowing time (min.) | Properties of foamed plastics | | |
|---|---|---|---|---|---|---|---|
| | glass beads | blowing agent | | | density (g/cm³) | compressive yield strength (kg/cm²) | bending strength (kg/cm²) |
| 60 | 40 | 4.5 | 0.25 | 16 | 0.121 | 2.4 | 4.5 |
| 50 | 50 | 3.5 | 0.20 | 14 | 0.144 | 3.0 | 7.0 |
| 40 | 60 | 3.0 | 0.20 | 12 | 0.161 | 3.9 | 8.7 |
| 100 | — | 5.0 | 0.35 | 16 | 0.11 | 0.5 | 1.1 |

COMPARATIVE EXAMPLE

Preparation process of foamed plastics was conducted in the same manner as described in Example 1 except that glass beads of 0.05 to 0.4 mm in diameter or of 3 to 5 mm were used in place of glass beads of 1 to 2 mm in diameter.

Preparation process of foamed plastics was carried out in the same manner as described in Example 1 except that a high density polyethylene resin (density 0.970 g/cm³, melt index 5.5) was employed in place of a polyethylene of Example 1 and the step of mixing raw materials was carried out at a temperature of 90° to 150°C.

The detailed conditions of the experiments and properties of the obtained foamed plastics are shown in Table 3.

Table 3

| poly-ethylene | Mixture of materials (part by weight) | | cross linking agent | Blowing time (min.) | Properties of foamed plastics | | |
|---|---|---|---|---|---|---|---|
| | glass beads | blowing agent | | | density (g/cm³) | compressive yield strength (kg/cm²) | bending strength (kg/cm²) |
| 50 | 50 | 3.8 | 1.2 | 13 | 0.250 | 14.1 | 35 |
| 40 | 60 | 0.8 | 1.0 | 13 | 0.331 | 19.2 | 41 |

Table 3-continued

| poly-ethylene | Mixture of materials (part by weight) | | cross linking agent | Blowing time (min.) | Properties of foamed plastics | | |
|---|---|---|---|---|---|---|---|
| | glass beads | blowing agent | | | density (g/cm³) | compressive yield strength (kg/cm²) | bending strength (kg/cm²) |
| 100 | 0 | 7.5 | 2.5 | 13 | 0.145 | 9.1 | 19 |

EXAMPLE 4

Preparation process of foamed plastics was carried out in the same manner as described in Example 1 except that a polypropylene (density 0.914 g/cm³, melt index 0.6) was used as a thermoplastic resin and the step of mixing raw materials was done at a temperature of 90° to 180°C.

The detailed conditions of the experiments and properties of the obtained foamed plastics are shown in Table 4.

Table 4

| poly-ethylene | Mixture of materials (part by weight) | | cross linking agent | Blowing time (min.) | Properties of foamed plastics | | |
|---|---|---|---|---|---|---|---|
| | glass beads | blowing agent | | | density (g/cm³) | compressive yield strength (kg/cm²) | bending strength (kg/cm²) |
| 50 | 50 | 3.5 | 0.20 | 14 | 0.291 | 21.6 | 44.1 |
| 100 | 0 | 7.5 | 2.5 | 13 | 0.183 | 10.1 | 20.6 |

What is claimed is:

1. Foamed plastics with improved mechanical strength and enhanced light reflection ability, which comprises foamed thermoplastic resin and glass beads of from 1 to 2 mm in diameter dispersed in said foamed resin.

2. A process of preparing foamed plastics with improved mechanical strength and enhanced light reflection ability, which comprises mixing a thermoplastic resin, glass beads of from 1 to 2 mm in diameter, a blowing agent and a cross-linking agent, charging and mixed composition to a mold and heating said composition at a temperature of from 180°C to 200°C under pressure.

3. A process of preparing foamed plastics with improved mechanical strength and enhanced light reflection ability, which comprises dry-blending thermoplastic beads containing a blowing agent and glass beads, charging said blends to a mold with a steam injector and introducing a heated steam into the mold.

4. Foamed plastics of claim 1, wherein the thermoplastic resin is a member selected from the group consisting of polyvinyl chloride, polystyrene, polyethylene, polypropylene, polybutadiene, polyisoprene, co-polymer of ethylene and vinylacetate co-polymer of ethylene and propylene, co-polymer of styrene and butadiene and a mixture of polyethylene and polybutadiene.

5. Process according to claim 2, wherein the thermoplastic resin is a member selected from the group consisting of polyvinyl chloride, polystyrene, polyethylene, polypropylene, polybutadiene, polyisoprene, co-polymer of ethylene and vinylacetate, co-polymer of ethylene and propylene, co-polymer of styrene and butadiene and a mixture of polyethylene and polybutadiene.

6. Process according to claim 3, wherein the thermoplastic resin is a member selected from the group consisting of polyvinyl chloride, polystyrene, polyethylene, polypropylene, polybutadiene, polyisoprene, co-polymer of ethylene and vinylacetate, co-polymer of ethylene and propylene, co-polymer of styrene and butadiene and a mixture of polyethylene and polybutadiene.

* * * * *